US012785414B2

(12) United States Patent
Gondo et al.

(10) Patent No.: US 12,785,414 B2
(45) Date of Patent: Nov. 3, 2026

(54) CHARGER

(71) Applicant: Yazaki Corporation, Tokyo (JP)

(72) Inventors: Ryo Gondo, Susono (JP); Michito Enomoto, Susono (JP); Daisuke Maezaki, Susono (JP); Yoshiya Ohnuma, Nagaoka (JP); Shunsuke Takuma, Nagaoka (JP); Shohei Komeda, Tokyo (JP)

(73) Assignee: Yazaki Corporation, Tokyo (JP)

( * ) Notice: Subject to any disclaimer, the term of this patent is extended or adjusted under 35 U.S.C. 154(b) by 492 days.

(21) Appl. No.: 18/583,219

(22) Filed: Feb. 21, 2024

(65) Prior Publication Data

US 2024/0291309 A1 Aug. 29, 2024

(30) Foreign Application Priority Data

Feb. 27, 2023 (JP) ................................ 2023-028106

(51) Int. Cl.
*H02J 7/06* (2006.01)
*H02M 3/335* (2006.01)

(52) U.S. Cl.
CPC ........... *H02J 7/06* (2013.01); *H02M 3/33573* (2021.05); *H02M 3/33584* (2013.01); *H02J 2207/20* (2020.01)

(58) Field of Classification Search
CPC .. H02J 7/06; H02J 2207/20; H02J 7/00; H02J 7/02; H02M 3/33573; H02M 3/33584; H02M 1/007; H02M 1/4225; H02M 7/219; H02M 1/0038; H02M 1/42
See application file for complete search history.

(56) References Cited

U.S. PATENT DOCUMENTS

2022/0060045 A1 2/2022 Imoto et al.
2023/0275451 A1* 8/2023 Taguchi .................... H02J 7/02 320/129

OTHER PUBLICATIONS

Shohei Komeda, et al., "A Dual Active Bridge AC-DC Converter with an Active Energy Buffer", Material of the Technical Committee on Semiconductor Power Converter, 2021, pp. 13-18, SPC-21-003.

(Continued)

*Primary Examiner* — Seung H Lee
(74) *Attorney, Agent, or Firm* — Sughrue Mion, PLLC

(57) ABSTRACT

A charger is configured such that when an output power value of a DC/DC converter is smaller than a first power value, a switch of the DC/DC converter and a first switch of a power pulsation absorbing circuit are controlled according to a discontinuous current mode during one entire period of an AC voltage inputted from a AC power supply; and wherein when the output power value of the DC/DC converter is equal to or greater than a second power value, the switch of the DC/DC converter and the first switch of the power pulsation absorbing circuit are controlled according to a continuous current mode during one entire period of the AC voltage.

10 Claims, 12 Drawing Sheets

(56) References Cited

OTHER PUBLICATIONS

Shohei Komeda, et al., "A Variable Frequency Control Method for a Dual-Active-Bridge AC-DC Converter with an Active Energy Buffer", lecture papers collection of 2021 IEE—Japan Industry Applications Society Conference, 2021, pp. 13-18, vol. 1, No. 30.

Shohei Komeda, "A Variable Switching Frequency Control Method for a Dual-Active-Bridge Single-Phase AC-DC Converter with an Active Energy Buffer", The 2022 International Power Electronics Conference (IPEC-Himeji 2022-ECCE Asia), 2022, pp. 1185-1190.

Shohei Komeda, "Boost Operation of a Dual-Active-Bridge AC-DC Converter with an Active Energy Buffer", IEEE, 2022, 6 pages.

* cited by examiner

| | SWITCH S21 | SWITCH S22 | SWITCH S23 | SWITCH S24 | SWITCH S25 | SWITCH S26 | SWITCH S27 | SWITCH S28 | SWITCH S31 |
|---|---|---|---|---|---|---|---|---|---|
| MODE 1 | on | off | off | on | off | on | on | off | on |
| MODE 2 | on | off | off | on | on | off | off | on | on |
| MODE 3 | on | off | off | on | on | off | off | on | off |
| MODE 4 | off | on | on | off | on | off | off | on | on |
| MODE 5 | off | off | off | off | off | off | off | off | off |
| MODE 6 | off | on | on | off | off | on | on | off | off |
| MODE 7 | off | on | on | off | off | on | on | off | on |

FIG.3

CHARGER

BACKGROUND OF THE INVENTION

Technical Field

The present invention relates to a charger.

Background Art

Various isolated single phase AC/DC converters have been considered as chargers for electric vehicles. Generally, a circuit arrangement is utilized as a charger for an electric vehicle, wherein the circuit arrangement includes a diode rectifier with a power factor correction (PFC) circuit, a high capacitance capacitor for a DC link, and high frequency isolated DC/DC converter. The high capacity capacitor for a DC link is required to have a capacitance which enables power pulsation due to a single-phase AC power supply to be absorbed. With the above-mentioned circuit arrangement, it is difficult to reduce a size of the capacitor.

As a compact charger which enables power pulsation to be absorbed, Patent Document 1 and Non-Patent Document 1 disclose a charger including a Dual-Active-Bridge (DAB) converter with an active buffer added, and control of such a charging circuit, the active buffer being intended for power pulsation absorption.

Control (discontinuous current mode) according to Patent Document 1 and Non-Patent Document 1 provides a phase (zero current phase) in which all switches of the DAB converter are switched off. Therefore, a large number of switching operations is performed, which may cause large switching loss. Furthermore, since all switches are switched off in the zero current phase, no current is expected to flow through an inductor L of the DAB converter. However, the switches are practically switched off at times which are offset, wherein this offset causes residual current and thus resonance between the inductor L of the DC/DC converter 120 and parasitic capacitances of the switches S21 to S28. Therefore, switching after the zero current phase will become hard switching, which results in switching loss.

For this reason, Non-Patent Documents 2 and 3 disclose control without zero current phases (continuous current mode). In such a continuous current mode, a switching frequency $f_{SW}$ of switching of the switches S21 to S28 of the DC/DC converter 120 and/or a first switch S31 of the power pulsation absorbing circuit 130 is changed during one period of an AC voltage inputted from an AC power supply, wherein the switching frequency $f_{SW}$ is changed such that no zero current phase exists, which enables oscillation of a current and a voltage of the inductor L to be removed, hard switching after the zero current phase to be avoided, and the charger to be controlled more efficiently.

CITATION LIST

Patent Literature

Patent Document 1: JP 2022-34820 A

Non-Patent Literature

Non-Patent Document 1: Shohei Komeda, Yoshiya Ohnuma, "A Dual Active Bridge AC-DC Converter with an Active Energy Buffer", Material of the Technical Committee on Semiconductor Power Converter, 2021, SPC-21-003, pp. 13-18

Non-Patent Document 2: Shohei Komeda, Shunsuke Takuma and Yoshiya Ohnuma "A Variable Frequency Control Method for a Dual-Active-Bridge AC-DC Converter with an Active Energy Buffer", lecture papers collection of 2021 IEE-Japan Industry Applications Society Conference, 2021, Vol. 1, No. 30, pp. 13-18

Non-Patent Document 3: S. Komeda, S. Takuma and Y. Ohnuma, "A Variable Switching Frequency Control Method for a Dual-Active-Bridge Single-Phase AC-DC Converter with an Active Energy Buffer," 2022 International Power Electronics Conference (IPEC-Himeji 2022-ECCE Asia), 2022, pp. 1185-1190

SUMMARY OF THE INVENTION

FIGS. 6 and 7 show changes of the switching frequency $f_{SW}$ during the continuous current mode. FIGS. 6 and 7 show changes of the switching frequency $f_{SW}$ at output power values of 1 kW, 3 kW and 7 kW of the DC/DC converter 120. In the continuous current mode, the switching frequency $f_{SW}$ has a significantly larger maximum value as the output power value is smaller, as shown in FIGS. 6 and 7. Therefore, the charger cannot be operated according to the continuous current mode when charging a small load.

An objective of the present invention is to provide a compact and efficient charger which enables pulsation of power to be absorbed.

In order to achieve the above-mentioned objective, a charger according to an embodiment of the present invention includes: a rectifier including two input terminals, a cathode terminal and an anode terminal, wherein the two input terminals are configured for connection to an AC power supply; a DC/DC converter including a first terminal, a second terminal and two output terminals, the first terminal being configured to be connected to the cathode terminal of the rectifier via a first line, the second terminal being configured to be connected to the anode terminal of the rectifier via a second line, wherein the output terminals are configured for connection to a battery; a power pulsation absorbing circuit including a first diode, a second diode, a third diode, an inductor, a capacitor, a first switch and a second switch; and a controller configured to control switching of a switch of the DC/DC converter and switching of the first switch and the second switch, wherein the first diode is connected between the inductor of the power pulsation absorbing circuit and one of the two input terminals of the rectifier, and the second diode is connected between the inductor and another of the two input terminals of the rectifier, wherein the capacitor and the first switch are connected in series between the first line and the second line with the capacitor being arranged closer to the second line than the first switch, wherein the third diode is connected between the inductor of the power pulsation absorbing circuit and a line which connects the capacitor to the first switch, wherein the second switch is connected between the second line and a line which connects the inductor of the power pulsation absorbing circuit to the third diode, wherein when an output power value of the DC/DC converter is smaller than a first power value, the controller is configured to control the switch of the DC/DC converter and the first switch according to a discontinuous current mode during one entire period of an AC voltage inputted from the AC power supply, and wherein when the output power value of the DC/DC converter is equal to or greater than a second power value, the controller is configured to control the switch of the DC/DC converter and the first switch according to a continuous current mode during one entire period of the AC voltage.

The present invention enables a compact and efficient charger to be provided which can absorb pulsation of power.

BRIEF DESCRIPTION OF THE DRAWINGS

FIG. 3 shows states of each of switches in various modes;

DETAILED DESCRIPTION OF THE PREFERRED EMBODIMENTS

<Charger 100>

Figure 1:
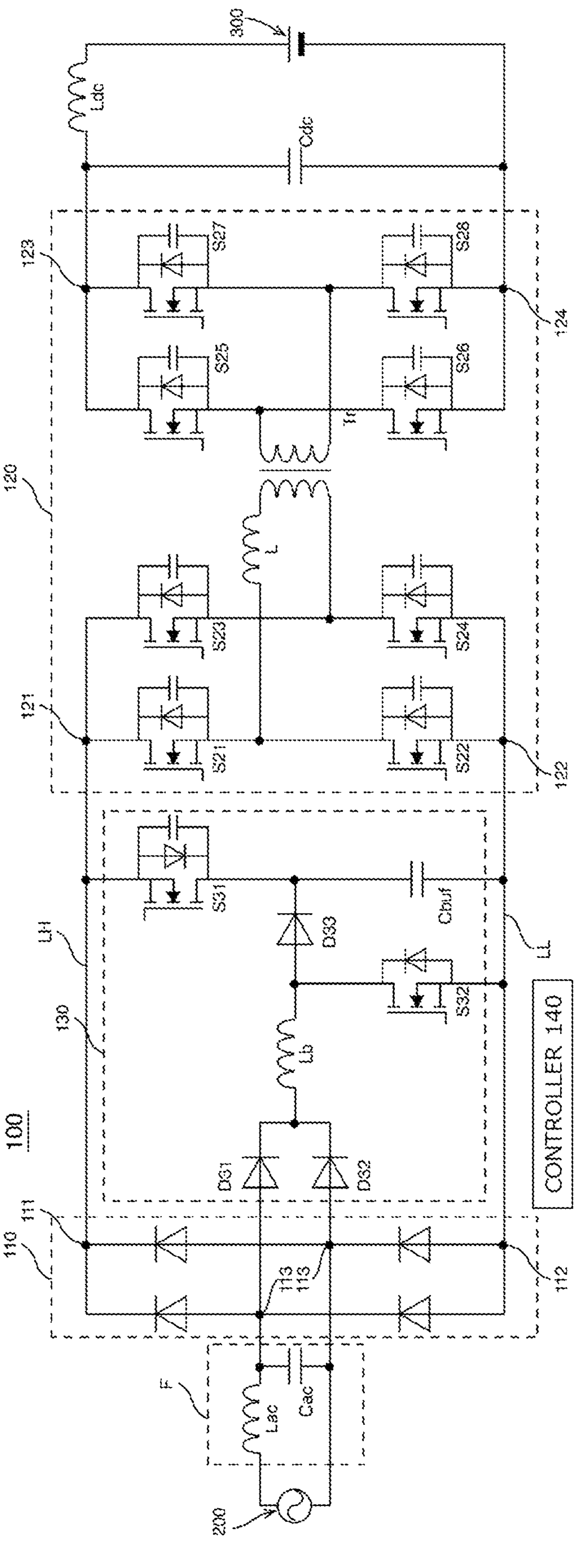
FIG. 1 shows a charger 100 according to an embodiment of the present invention.

FIG. 1 shows a charger 100 according to an embodiment of the present invention. The charger 100 includes a rectifier 110, a DC/DC converter 120, a power pulsation absorbing circuit 130, and a controller 140. The charger 100 converts the single-phase AC voltage $v_S$ inputted from the single-phase AC power supply 200 to a DC voltage $V_{dc}$, and outputs it to a battery 300.

The rectifier 110 includes a cathode terminal 111 and an anode terminal 112 connected to DC/DC converter 120, and two input terminals 113 for connection to the AC power supply 200. For example, the rectifier 110 is configured as a bridge diode rectifier formed by four diodes, receives an AC current applied between the two input terminals 113 connected to the AC power supply, converts the current into a DC current and outputs it from the cathode terminal 111, as shown in FIG. 1. As shown in FIG. 1, the rectifier 110 may be configured to be connected to the AC power supply 200 via a filter F, wherein the filter F includes an inductor Lac and a capacitor Cac.

For example, the DC/DC converter 120 is configured as a DAB (Dual Active Bridge) converter. The DC/DC converter 120 includes a first terminal 121, a second terminal 122, a third terminal 123 and a fourth terminal 124, the first terminal 121 being connected to the cathode terminal 111 of the rectifier 110, the second terminal 122 being connected to the anode terminal 112 of the rectifier 110, wherein the third and fourth terminals 123 and 124 are configured for connection to a positive electrode and a negative electrode of the battery 300, respectively. The DC/DC converter 120 includes a transformer Tr as well as four switches on an input side (primary side), i.e., a first switch S21, a second switch S22, a third switch S23 and a fourth switch S24, and four switches on an output side (secondary side), i.e., a fifth switch S25, a sixth switch S26, a seventh switch S27 and an eighth switch S28, wherein the transformer Tr is arranged between the four switches on the input side and the four switches on the output side. For example, each of the eight switches S21~S28 is configured as an N-channel power MOSFET (Metal-Oxide-Semiconductor Field-Effect Transistor) with a reverse polarity diode (body diode). In this case, the N-channel power MOSFET may include a snubber capacitor.

The full bridge circuit on the primary side of the DC/DC converter 120 includes two legs connected between the first terminal 121 and the second terminal 122 (a leg including a first switch S21 and a second switch S22 and a leg including a third switch S23 and a fourth switch S24), while the full bridge circuit on the secondary side of the DC/DC converter 120 includes two legs between the third terminal 123 and the fourth terminal 124 (a leg including a fifth switch S25 and a sixth switch S26 and a leg including a seventh switch S27 and an eighth switch S28).

The DC/DC converter 120 includes an inductor L on the primary side of the transformer Tr. This inductor L is, for example, a leakage inductor of the transformer Tr.

Further, a DC capacitor Cdc is connected between the third terminal 123 and the fourth terminal 124 of DC/DC converter 120. An inductor Lde may be connected between the third terminal 123 of the DC/DC converter 120 and the positive electrode of the battery 300.

The power pulsation absorbing circuit 130 includes a first diode D31, a second diode D32, a third diode D33, an inductor Lb, a buffer capacitor Cbuf, a first switch S31, and a second switch S32.

The first diode D31 of power pulsation absorbing circuit 130 is connected between the inductor Lb of the power pulsation absorbing circuit 130 and one of the two input terminal 113 of the rectifier 110. The second diode D32 of power pulsation absorbing circuit 130 is connected between the inductor Lb of the power pulsation absorbing circuit 130 and the other of the two input terminal 113 of the rectifier 110. In this case, each of the first diode D31 and second diode D32 of the power pulsation absorbing circuit 130 is connected between the inductor Lb of the power pulsation absorbing circuit 130 and the input terminals 113 of the rectifier 110 so that these diodes have a forward direction extending from the input terminals 113 of the rectifier 110 to the inductor Lb. Therefore, even when the AC power supply 200 is connected to the input terminals 113 of the rectifier 110, a DC current is applied to the inductor Lb of power pulsation absorbing circuit 130.

The buffer capacitor Cbuf of the power pulsation absorbing circuit 130 and the first switch S31 are connected in series between a first line LH and a second line LL, wherein the first line LH connects the cathode terminal 111 of the rectifier 110 to the first terminal 121 of the DC/DC converter 120, and the second line LL connects the anode terminal 112 of the rectifier 110 to the second terminal 122 of the DC/DC converter 120. The buffer capacitor Cbuf is arranged closer to the second line LL, and the first switch 31 is arranged closer to the first line LH. The first switch S31 is configured as an N-channel power MOSFET (Metal-Oxide-Semiconductor Field-Effect Transistor) with a reverse polarity diode (body diode). In this case, a source and a drain of the N-channel power MOSFET may be preferably connected to the first line LH and the buffer capacitor, respectively.

The third diode D33 of the power pulsation absorbing circuit 130 is connected between line connecting the buffer capacitor Cbuf of the power pulsation absorbing circuit 130 to the first switch S31 on the one hand and the inductor Lb of the power pulsation absorbing circuit 130 on the other hand so that the third diode D33 has a forward direction along a direction extending from the inductor Lb to this line.

The second switch S32 of the power pulsation absorbing circuit 130 is connected between the second line LL and a line connecting the inductor Lb of the power pulsation absorbing circuit 130 to the third diode D33. The second switch S32 is configured as an N-channel power MOSFET (Metal-Oxide-Semiconductor Field-Effect Transistor) with a reverse polarity diode (body diode). In this case, a drain of the N-channel power MOSFET may be preferably connected to the line connecting the inductor Lb of the power pulsation absorbing circuit 130 to the third diode D33, wherein a source of the N-channel power MOSFET may be preferably connected to the second line LL.

The controller 140 controls switching of the switches S21 to S28 of the DC/DC converter 120 as well as switching of the switches S31 and S32 of the power pulsation absorbing circuit 130.

Since the power pulsation absorbing circuit 130 includes a first diode D31, a second diode D32, a third diode D33, an inductor Lb, a buffer capacitor Cbuf, a first switch S31, and a second switch S32, the power pulsation absorbing circuit 130 may serve as a power factor correction (PFC) circuit. Therefore, according to the present embodiment, control is possible which provides the following sinusoidal voltage $v_S$ and sinusoidal current $i_S$ to the charger 100 from the AC power supply 200:

$$v_S(t) = \sqrt{2}\,V_S \sin\omega_S t$$

$$i_S(t) = \sqrt{2}\,I_S \sin\omega_S t$$

wherein $V_S$ indicates an effective value of the power supply voltage and $I_S$ indicates an effective value of the power supply current.

Figure 2:
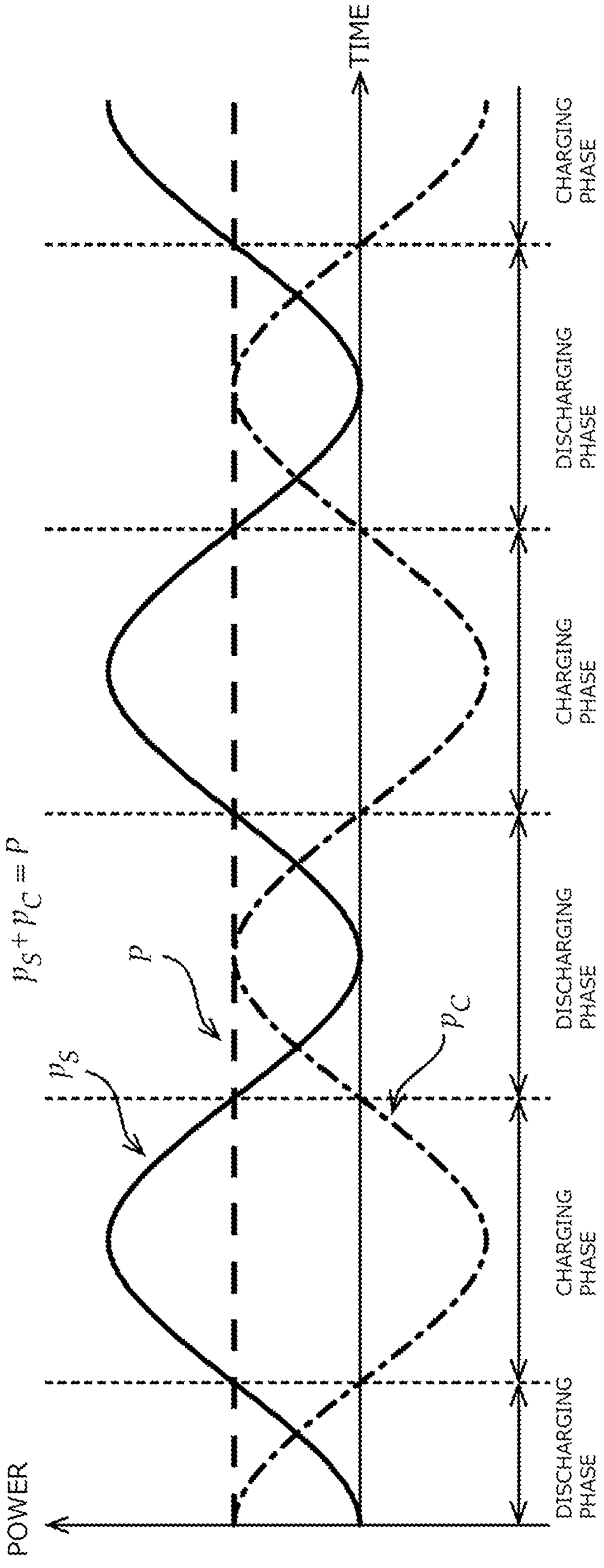
FIG. 2 shows a relation between an instantaneous power $p_s$ outputted from an AC power supply and an instantaneous power pc outputted from a buffer capacitor Cbuf.

In this case, an instantaneous power $p_S$ outputted from the AC power supply 200 is formed by a sum of an average power P ($=V_S I_S$) and a pulsation component $p_{rip}$(t) ($=-V_S I_S \cos 2\omega_S t$) as shown below, wherein the instantaneous power $p_S$ pulsates around the average power P (dashed line in FIG. 2) with an angular frequency which is twice as high as an angular frequency ω of the AC, as shown with a solid line in FIG. 2.

$$p_S(t) = v_S i_S = V_S I_S(1 - \cos 2\omega_S t) = P + p_{rip}(t)$$

For the above-mentioned reasons, the controller 140 controls switching of the switches S21 to S28 of the DC/DC converter 120 as well as switching of the switches S31 and S32 of the power pulsation absorbing circuit 130 to absorb power pulsation due to the AC power supply in the power pulsation absorbing circuit 130 so that a constant power is inputted to the DC/DC converter 120.

In this case, the charger 100 according to the present embodiment is provided such that different controls are applied for the instantaneous power from the AC power supply 200 being higher than the average power ($p_S$>P) and for the instantaneous power being lower than the average power ($p_S$<P).

In the case of the instantaneous power $p_S$ from the AC power supply being higher than the average power P ($p_S$>P), switching of the eight switches S21 to S28 of the DC/DC converter 120 and the two switches S31 and S32 of the power pulsation absorbing circuit 130 are controlled to charge the pulsation component $p_{rip}$ of the instantaneous power $p_S$ from the AC power supply 200 to the buffer capacitor Cbuf via the inductor Lb of the power pulsation absorbing circuit 130, whereby only the average power P of the power outputted from the AC power supply may be provided to the DC/DC converter 120. This means that according to the present embodiment, the buffer capacitor Cbuf is charged in a phase in which a higher instantaneous power $p_S$ than the average power P is outputted from the AC power supply (charging phase), wherein a negative instantaneous power pc is outputted from the buffer capacitor Cbuf, as shown with a dashed dotted line in FIG. 2.

On the other hand, in the case of the instantaneous power $p_S$ from the AC power supply 200 being lower than the average power P ($p_S$<P), switching of the eight switches S21 to S28 of the DC/DC converter 120 and the first switch S31 of the power pulsation absorbing circuit 130 are controlled while maintaining the second switch S32 of the power pulsation absorbing circuit 130 in an off-state to actively discharge the buffer capacitor Cbuf via the first switch S31. This compensates the pulsation component $p_{rip}$, i.e., a difference between the instantaneous power $p_S$ and the average power P outputted from the AC power supply 200 to input the average power P to the DC/DC converter 120. This means that according to the present embodiment, the buffer capacitor Cbuf is discharged in a phase in which a lower instantaneous power $p_S$ than the average power P is outputted from the AC power supply (discharging phase), wherein a positive instantaneous power pc is outputted from the buffer capacitor Cbuf, as shown with a dashed dotted line in FIG. 2.

In other words, according to the present embodiment, the controller 140 controls switching of the switches S21 to S28 of the DC/DC converter 120, the switches S31 and S32 of the power pulsation absorbing circuit 130 to obtain a constant sum of the instantaneous power $p_S$ outputted from the AC power supply 200 and the instantaneous power pc outputted from the buffer capacitor Cbuf.

In this manner, the present embodiment is provided such that the buffer capacitor Cbuf is actively discharged during the discharging phase. Consequently, the present embodiment enables an amount of power accumulated in the buffer capacitor Cbuf (i.e., capacitance of the buffer capacitor Cbuf) to be limited, whereby the buffer capacitor Cbuf can be reduced in size.

Further, according to the present embodiment, the second switch S32 is activated only during the charging phase. Consequently, the present embodiment enables an amount of power accumulated in the inductor Lb (i.e., inductance of the inductor Lb) to be limited, whereby the inductor Lb can be reduced in size.

Further, according to the present embodiment, a power without pulsation is inputted to the DC/DC converter 120. Consequently, the present embodiment enables the transformer Tr of the DC/DC converter 120 and/or the DC capacitor Cdc to be reduced in size.

In this manner, the present embodiment enables passive elements to be reduced in size, for example capacitors and inductors. Consequently, the present embodiment enables a compact charger to be provided which can absorb pulsation of power.

<Switching Modes and Operation Waveform>

The controller 140 controls switching of the switches S21 to S28 of the DC/DC converter 120 and the first switch S31 of the power pulsation absorbing circuit 130 according to seven modes to obtain an operation waveform $i_L$ of the inductor L of the DC/DC converter 120 which is approximable by a rectangular waveform. FIG. 3 shows respective states of each of switches in the seven modes. The seven modes a mode (mode 5) in which the switches S21 to S28 of the DC/DC converter 120 and the first switch S31 of the power pulsation absorbing circuit 130 are all switched off.

Figure 4:
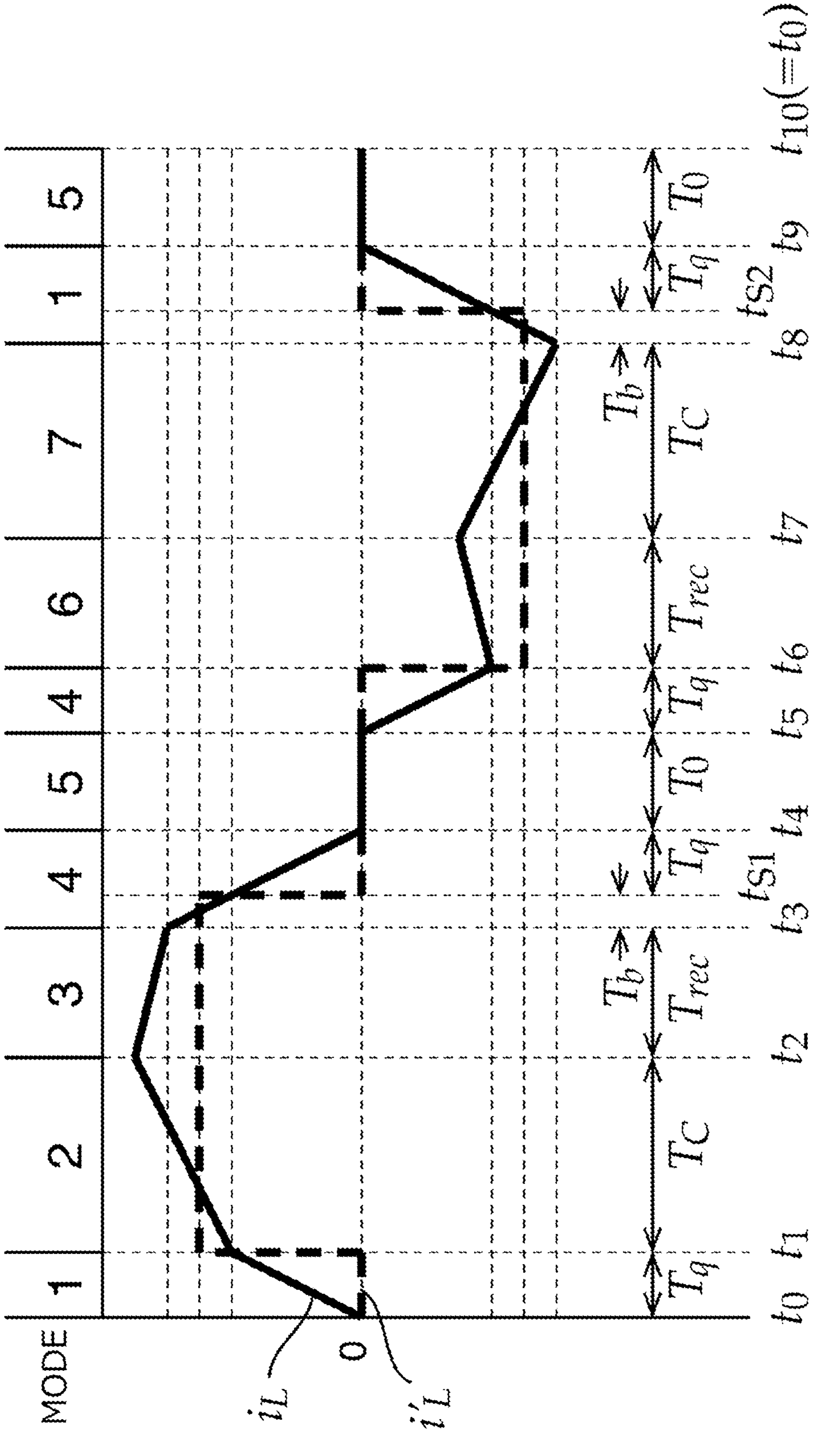
FIG. 4 shows an operation waveform $i_L$ of an inductor L of a DC/DC converter 120 according to the embodiment and a corresponding equivalent rectangular waveform $i_L'$ (discontinuous current mode)

FIG. 4 shows an operation waveform $i_L$ of an inductor L of a DC/DC converter 120 according to the present embodiment and a corresponding equivalent rectangular waveform $i_L'$. This operation waveform $i_L$ is obtained by switching the seven modes as shown in FIG. 3 to mode 1, mode 2, mode 3, mode 4, mode 5, mode 4, mode 6, mode 7, mode 1 and mode 5 in this order. In this case, a current $i_L$ is obtained in each of the seven modes as follows (Patent Document 1 and Non-Patent Document 1):

$$i_L(t) = \begin{cases} \frac{v_C + V_{dc}}{L}(t - t_{c1}) + i_L(t_{c1}) & \text{(Mode 1)} \\ \frac{v_C - V_{dc}}{L}(t - t_{c2}) + i_L(t_{c2}) & \text{(Mode 2)} \\ \frac{v_{rec} - V_{dc}}{L}(t - t_{c3}) + i_L(t_{c3}) & \text{(Mode 3)} \\ -\frac{v_C + V_{dc}}{L}(t - t_{c4}) + i_L(t_{c4}) & \text{(Mode 4)} \\ 0 & \text{(Mode 5)} \\ -\frac{v_{rec} - v_{dc}}{L}(t - t_{c6}) + i_L(t_{c6}) & \text{(Mode 6)} \\ -\frac{v_C - V_{dc}}{L}(t - t_{c7}) + i_L(t_{c7}) & \text{(Mode 7)} \end{cases} \quad (1)$$

wherein $t_{cn}$ (n=1 to 7) indicates a time at which switching to mode n is performed.

According to the present embodiment, in order to discharge the buffer capacitor Cbuf more actively when the first switch S31 of the power pulsation absorbing circuit 130 is in an on-state, the controller 140 controls a voltage $v_C$ applied to the buffer capacitor Cbuf such that the voltage $v_C$ is always higher than an instantaneous voltage $v_{rec}$ outputted from the rectifier 110. Therefore, according to the present embodiment, the voltage $v_C$ applied to the buffer capacitor Cbuf has a value which is different from the instantaneous voltage $v_{rec}$ of the rectifier 110, and modes 2 and 3 have different gradients of the operation waveform $i_L$. Similarly, modes 6 and 7 have different gradients of the operation waveform $i_L$. In this manner, the present embodiment enables operation waveforms to be generated which are asymmetrical with respect to $i_L$=0 in positive and negative waveforms, as shown in FIG. 4.

For the operation waveform $i_L$ as shown in FIG. 4, it is possible to approximate it by an equivalent rectangular waveform $i_L'$ if $t_0$ to $t_{10}$ are set such that $|t_0-t_1|=|t_5-t_6|$, $|t_1-t_2|=|t_7-t_8|$, $|t_2-t_3|=|t_6-t_7|$, $|t_3-t_4|=|t_8-t_9|$, and if $t_{S1}$ and $t_{S2}$ are set between $t_3$ and $t_4$ and between $t_8$ and $t_9$ respectively such that $|t_0-t_1|=|t_{S1}-t_4|=|t_{S2}-t_9|$.

$$i_L'(t) = \begin{cases} \frac{i_L(t_1) + i_L(t_3)}{2} = I_L' & (t_1 \le t \le t_{S1}) \\ -I_L' & (t_6 \le t \le t_{S2}) \\ 0 & (t_0 \le t \le t_1,\ t_{S1} < t < t_6,\ t_{S2} < t < t_{10}) \end{cases}$$

If phases of $t_0 \le t < t_1$, $t_{S1} \le t < t_4$, $t_5 \le t < t_6$, and $t_{S2} \le t < t_9$ of the equivalent rectangular waveform $i_L'$ are defined as reactive current phases $T_q$, phases of $t_1 \le t < t_2$ and $t_7 \le t < t_8$ are defined as buffer capacitor discharge current phases $T_C$, phases of $t_2 \le t < t_3$ and $t_6 \le t < t_7$ are defined as power supply current phases $T_{rec}$, phases of $t_3 \le t < t_{S1}$ and $t_8 \le t < t_{S2}$ are defined as current balance phases $T_b$, and phases of $t_4 \le t < t_5$ and $t_9 \le t < t_{10}$ are defined as zero current phases $T_0$, a duty cycle for each of the phases within a switching period $T_{SW}$ is as follows:

$$\begin{cases} D_q = \frac{2T_q}{T_{SW}} = \frac{2I_L' L}{(v_C + V_{dc})T_{SW}} - \frac{D_b}{2} \\ D_C = \frac{2T_C}{T_{SW}} = \frac{i_C}{I_L'} + D_b = \frac{(v_{rec} - v_{dc})i_{rec} + (v_C + V_{dc})i_c}{2V_{dc}I_L'} \\ D_{rec} = \frac{2T_{rec}}{T_{SW}} = \frac{i_{rec}}{I_L'} \\ D_b = \frac{2T_b}{T_{SW}} = \frac{(v_{rec} - V_{dc})i_{rec} + (v_C - V_{dc}i_C}{2V_{dc}I_L'} \\ D_0 = \frac{2T_0}{T_{SW}} = 1 - (2D_q + D_C + D_{rec} + D_b) \end{cases} \quad (2)$$

The duty cycle of each of the phases can be obtained by giving $i_{rec}$, $i_C$, $v_V$ and $V_{dc}$, $I_L'$ as set values. The obtained duty cycles of phases may be used to determine a control rule for the operation waveform $i_L$ in FIG. 4. Among these set values, set values $i_{rec}$* and $i_C$* for $i_{rec}$ and $i_C$ are switched as follows for the discharging phase and charging phase, wherein the power pulsation absorbing circuit 130 is operated to function as a PFC circuit and as a circuit for absorbing power pulsation:

$$i_{rec}^* = \begin{cases} \sqrt{2}\frac{P}{V_S}|\sin\omega_S t| & \text{(Discharging phase)} \\ \frac{P}{\sqrt{2}V_S|\sin\omega_S t|} & \text{(Charging phase)} \end{cases}$$

$$i_C^* = \begin{cases} \frac{P}{v_C}\cos 2\omega_S t & \text{(Discharing phase)} \\ 0 & \text{(Charging phase)} \end{cases}$$

<Discontinuous Current Mode and Continuous Current Mode>

The operation waveform as shown in FIG. 4 is obtained by switching the switches S21 to S28 of the DC/DC converter 120 and the first switch S31 of the power pulsation absorbing circuit 130 at a constant switching frequency $f_{SW}$ without changing the switching frequency $f_{SW}$. The operation waveform as shown in FIG. 4 includes zero current phases $T_0$ in which the current $i_L$ flowing through the reactor L is zero. An operation by switching to mode 1, mode 2, mode 3, mode 4, mode 5, mode 4, mode 6, mode 7, mode 1 and mode 5 in this order as shown FIG. 4 is a discontinuous current mode (DCM).

The zero current phase $T_0$ is mode 5, wherein in this phase, all the switches S21 to S28 of DC/DC converter 120 are switched off. However, the switches are practically switched off at times which are offset, wherein this offset causes residual current and thus resonance between the inductor L of the DC/DC converter 120 and parasitic capacitances of the switches S21 to S28. Therefore, in the discontinuous current mode, switching after the zero current phase $T_0$ (switching in a changing process from mode 5 to mode 4, switching in a changing process from mode 5 to mode 1) will become hard switching, which results in switching loss.

Therefore, the switching frequencies $f_{SW}$ the switches S21 to S28 of the DC/DC converter 120 and/or of the first switch S31 of the power pulsation absorbing circuit 130 may be preferably changed within one period of the AC voltage $v_S$ inputted from the AC power supply 200 so that no zero current phase $T_0$ exists, namely so that operation in a continuous current mode (CCM) is achieved (Non-Patent Documents 2 and 3). In this manner, it is possible to remove oscillation of a current $i_L$ and a voltage $V_L$ of the inductor L and to avoid hard switching after the zero current phase $T_0$ to control the charger 100 more efficiently in the continuous current mode.

By solving the formula (2) with $D_0=0$, the switching frequency $f_{SW}$ with which no zero current phase $T_0$ exists, i.e., the switching frequency $f_{SW}$ in the continuous current mode, is determined as follows:

$$f_{SW} = \frac{v_C + V_{dc}}{4I_L'L}(1 - D_{rec} - D_C) \tag{3}$$

Figure 5:
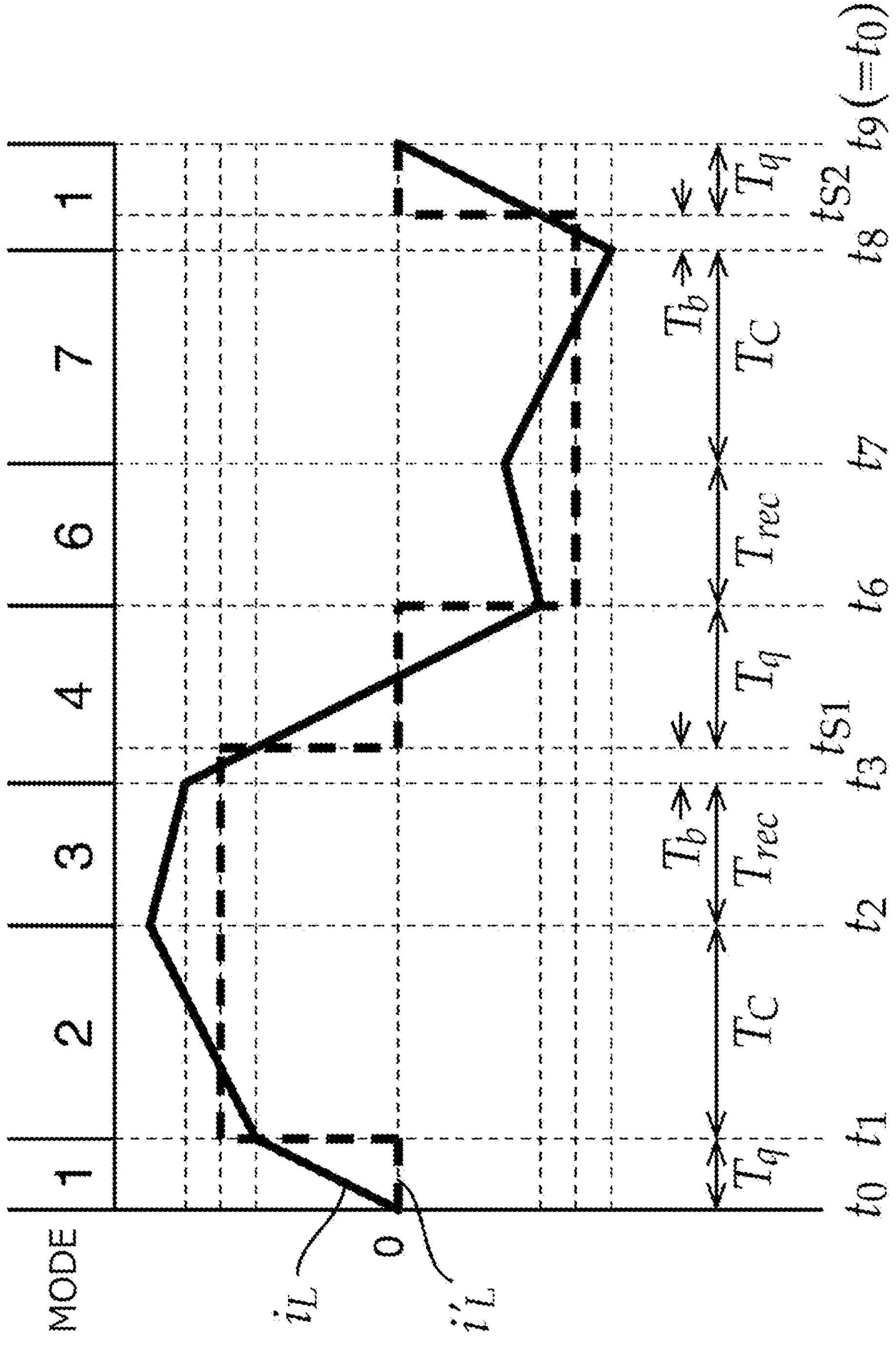
FIG. 5 shows an operation waveform $i_L$ of an inductor L of a DC/DC converter 120 according to the embodiment and a corresponding equivalent rectangular waveform $i_L'$ (continuous current mode)

FIG. 5 shows an operation waveform $i_L$ of the inductor L of the DC/DC converter 120 and a corresponding equivalent rectangular waveform $i_L'$ in the continuous current mode. Since no operation in the mode 5 is carried out in the continuous current mode, the switches S21 to S28 of the DC/DC converter 120 and the first switch S31 of the power pulsation absorbing circuit 130 are switched to mode 1, mode 2, mode 3, mode 4, mode 6, mode 7 and mode 1 in this order.

It is possible to operate the charger 100 more efficiently by optimizing a set value of the peak value $I_L'$ of the equivalent rectangular wave $i_L'$ (Non-Patent Documents 2 and 3). For example, the set value of the peak value $I_L'$ of the equivalent rectangular waveform $i_L'$ may be controlled so as to obtain a predetermined value (first frequency value) $f_i$ of the switching frequency $f_{SW}$ (the above formula (3)) at a phase $\omega_S t$ of 45 degrees of the AC power supply voltage $v_S$, whereby the charger 100 can be operated more efficiently. In this case, the set value $I_L'^*$ of the peak value $I_L'$ of the equivalent rectangular waveform $i_L'$ is determined as follows:

$$I_L^{\prime *} = \frac{V_{dc} + V_{C_{min}}}{8f_1L}\left[1 - \sqrt{1 - \frac{8f_1LI_S(V_s + V_{dc})}{V_{dc}(V_{dc} + V_{C_{min}})}}\right] \tag{4}$$

$$V_{C_{min}} = \sqrt{V_{C_{max}}^2 - \frac{2P}{\omega_S C_{buf}}}$$

wherein $V_{Cmin}$ indicates a minimum value of the voltage applied to the buffer capacitor Cbuf.

Figure 6:
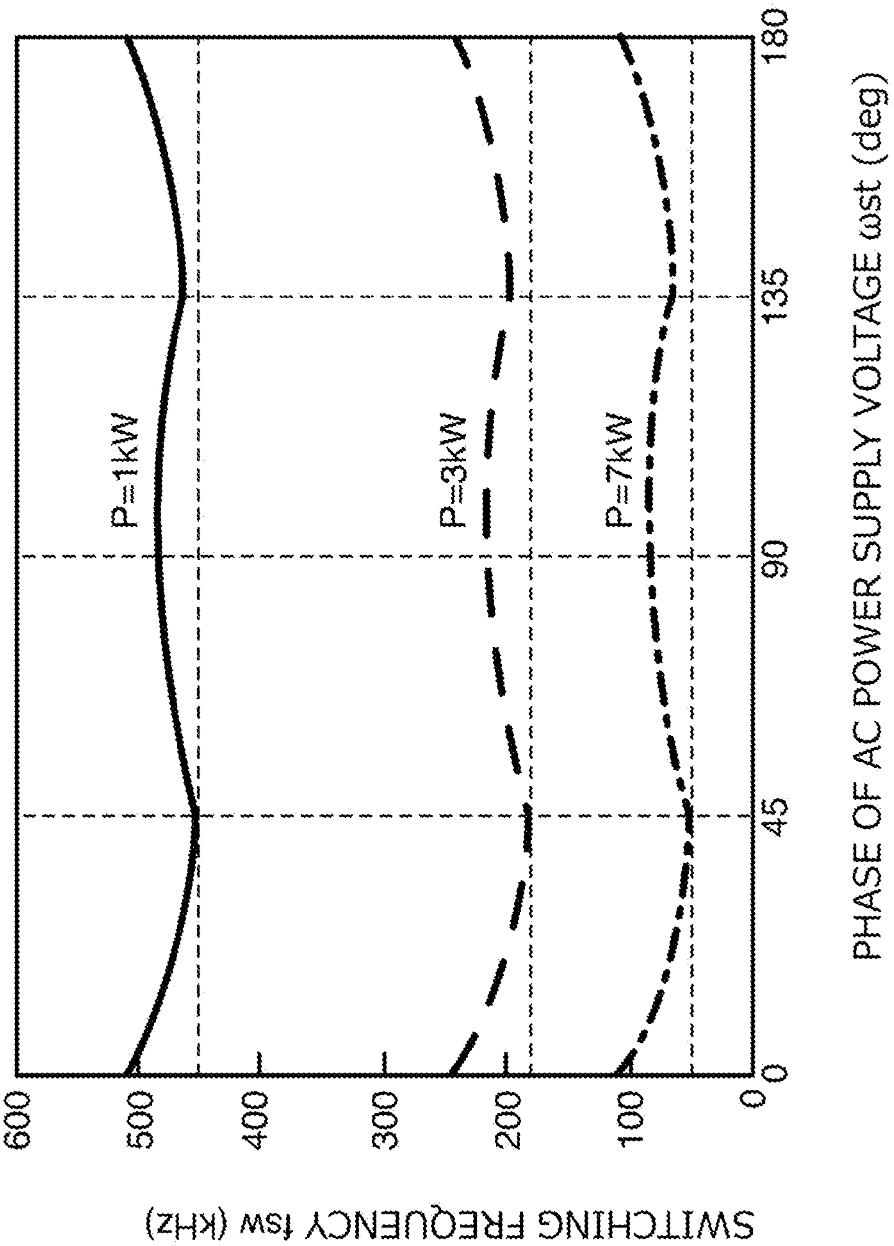
FIG. 6 shows an exemplar switching frequency $f_{SW}$ when a current set value $I_L'$ is not optimized.
Figure 7:
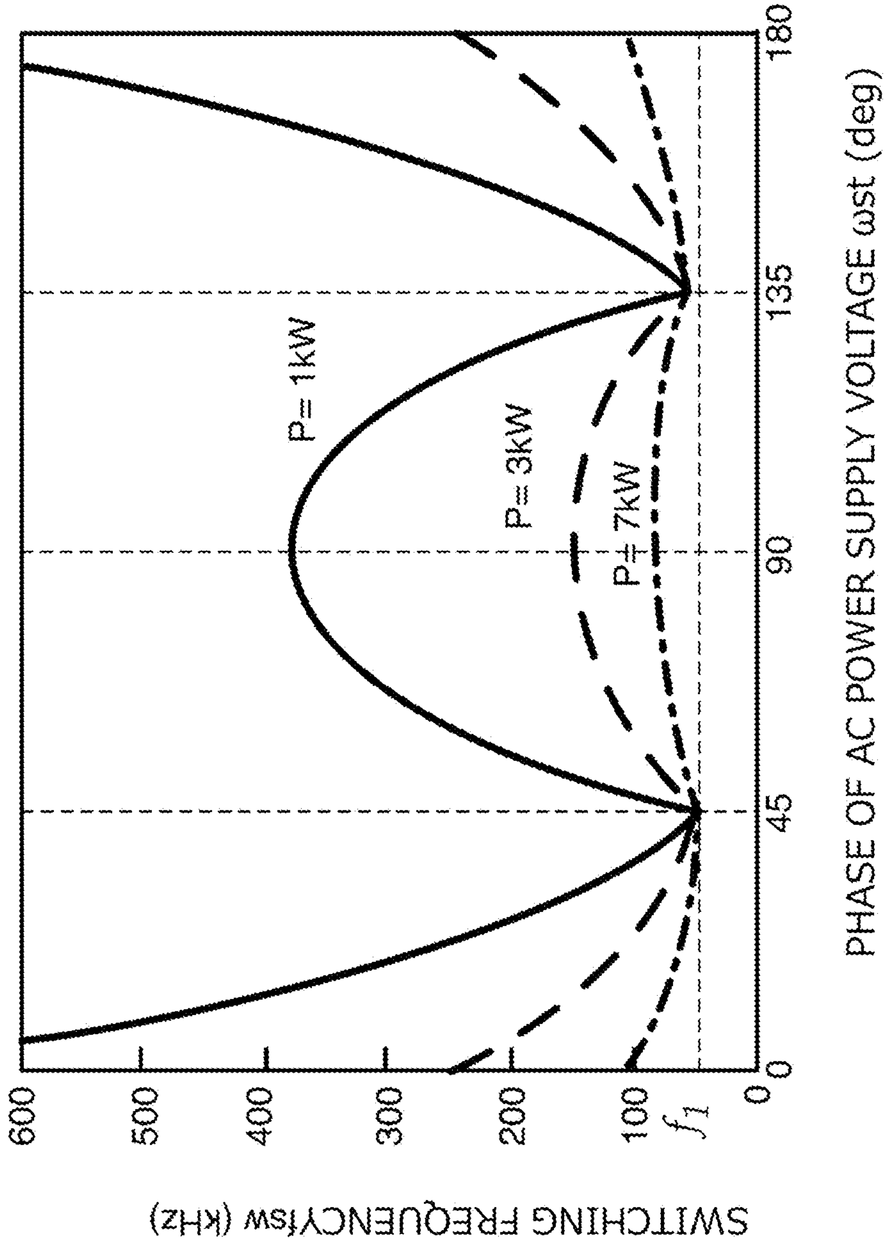
FIG. 7 shows an exemplar switching frequency $f_{SW}$ when a current set value $I_L'$ is optimized.

FIGS. 6 and 7 show examples of a change of the switching frequency $f_{SW}$ during the continuous current mode. FIG. 6 shows an exemplar switching frequency $f_{SW}$ when a current set value $I_L'$ is not optimized, while FIG. 7 shows an exemplar switching frequency $f_{SW}$ when a current set value $I_L'$ is optimized. FIGS. 6 and 7 show examples of a change of the switching frequency $f_{SW}$ at output power values Pout of 1 kW, 3 kW and 7 kW of the DC/DC converter 120.

In the continuous current mode, the switching frequency $f_{SW}$ has a significantly larger maximum value as the output power value Pout is smaller, as shown in FIGS. 6 and 7. Particularly, the maximum value of the switching frequency $f_{SW}$ with the current set value $I_L'$ optimized is increased promptly with reduction in the output power value Pout. Therefore, the charger 100 cannot be operated according to the continuous current mode when charging a small load.

Therefore, according to the present embodiment, the controller 140 controls the switches S21 to S28 of the DC/DC converter 120 and the first switch S31 of the power pulsation absorbing circuit 130 according to the discontinuous current mode during all phases of one period of the AC voltage $v_S$ inputted from the AC power supply 200 when the output power value Pout of the DC/DC converter 120 is smaller than a first power value $P_{O1}$. When output power value Pout of the DC/DC converter 120 is equal to or greater than a second power value $P_{O2}$, the controller 140 controls the switches S21 to S28 of the DC/DC converter 120 and the switch S31 of the power pulsation absorbing circuit 130 according to the continuous current mode during all phases of one period of the AC voltage $v_S$ inputted from the AC power supply 200.

In this case, the second power value $P_{O2}$ may be selected e.g. such that the maximum value of the switching frequency $f_{SW}$ when switching is performed according to the continuous current mode during all phases of one entire period of the AC voltage $v_S$ is equal to or smaller than an upper limit value fc for an operable frequency value of the switching frequency $f_{SW}$.

Figure 8:
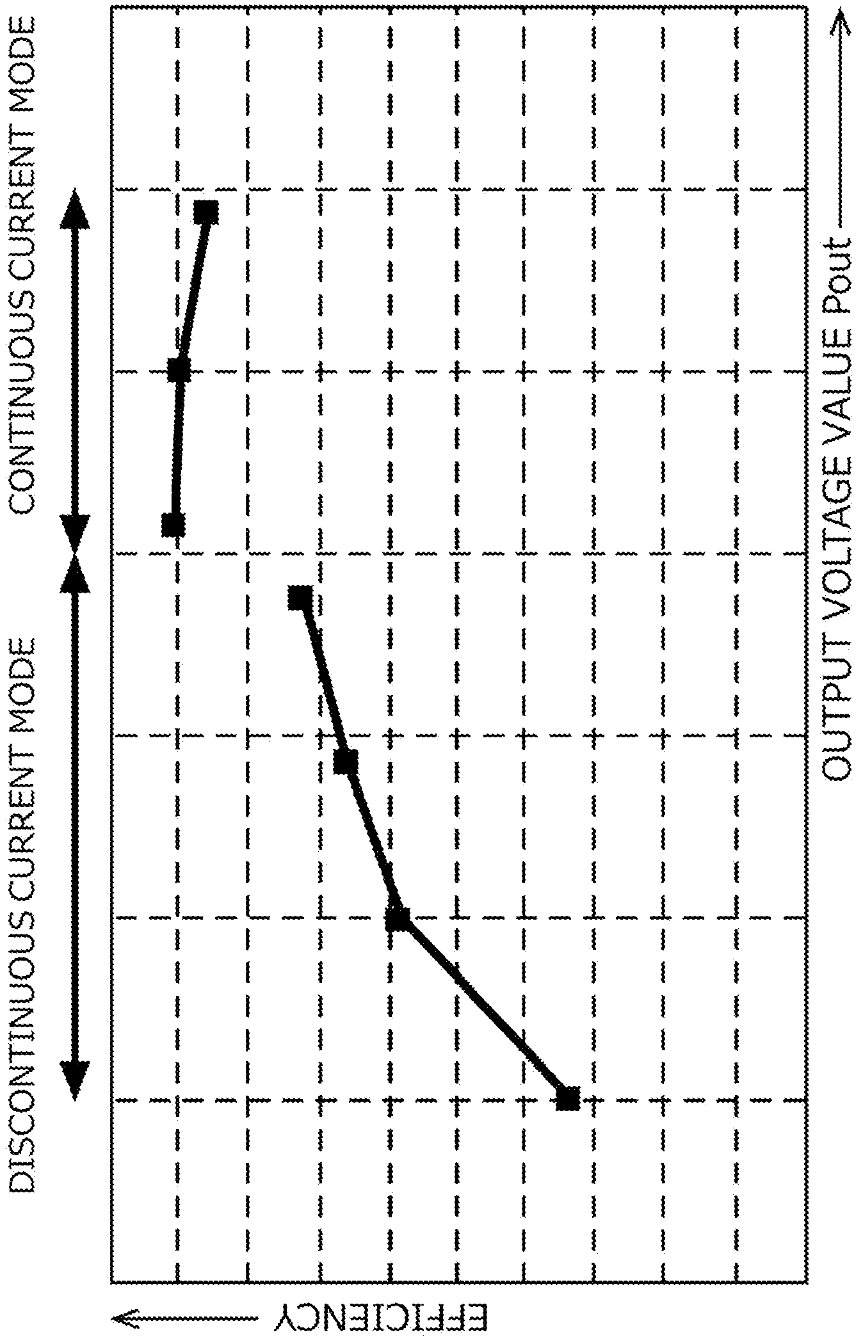
FIG. 8 shows an example of a relationship between an output power value Pout and an efficiency.

Furthermore, the first power value $P_{O1}$ may be equal to the second power value $P_{O2}$. As described above, efficiency is worse when switching is performed according to the discontinuous current mode than when switching is performed according to the continuous current mode, wherein in the case of the first power value $P_{O1}$ being equal to the second power value $P_{O2}$, the efficiency of switching according to the discontinuous current mode deviates from that of switching according to the continuous current mode, as shown in FIG. 8.

<Mixed Operation of the Continuous Current Mode and Discontinuous Current Mode>

As described above, the switching frequency $f_{SW}$ has a larger maximum value as the output power value Pout of the DC/DC converter 120 is smaller. Depending on the output power value Pout of the DC/DC converter 120, the switching frequency $f_{SW}$ may therefore have a maximum value which is not operable, whereby the continuous current mode cannot be used.

Figure 9:
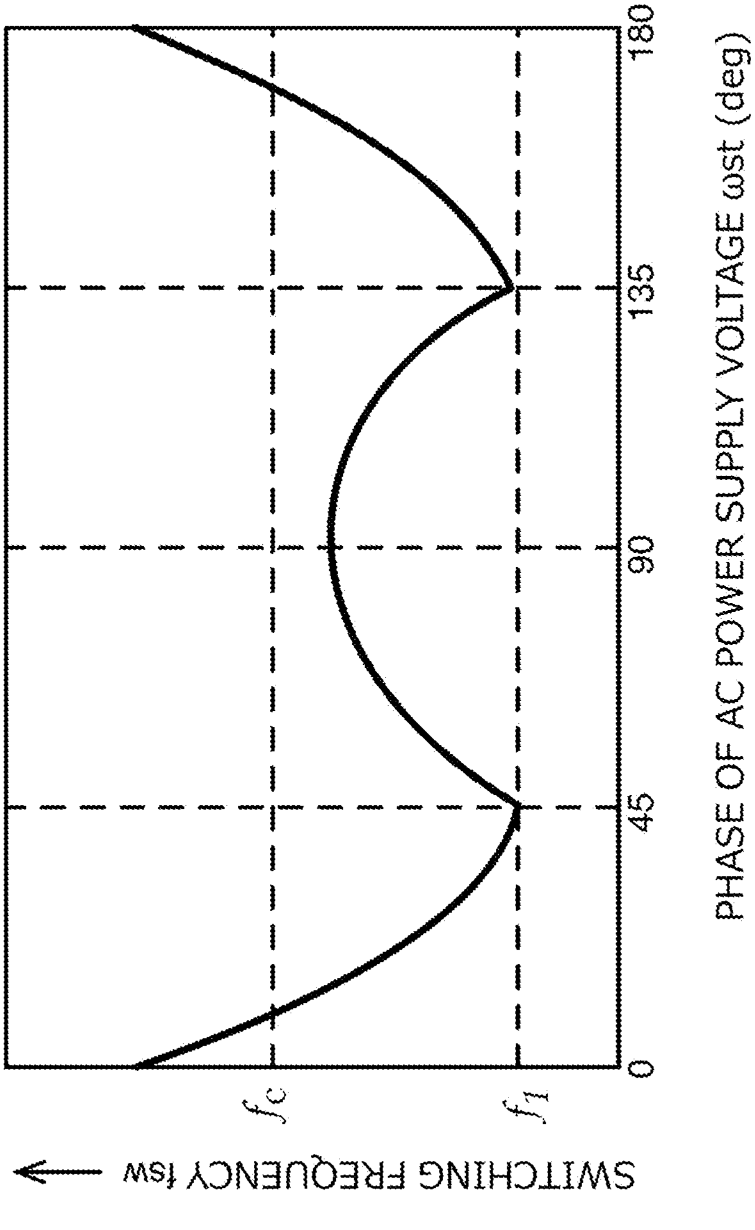
FIG. 9 shows a diagram for explanation of a relationship between an upper limit value fc for an operable frequency value of the switching frequency $f_{SW}$ and a first frequency value $f_1$.

However, when the current set value $I_L'$ is optimized, selecting the first frequency value $f_1$ smaller than the upper limit value fc for the operable frequency value of the switching frequency $f_{SW}$ results in the switching frequency $f_{SW}$ having an operable value around at a time at which the AC power supply voltage $v_S$ has a phase $\omega_S t$ of 45 degrees, as shown in FIG. 9. This means that when the current set value $I_L'$ is optimized, one period of the AC voltage $v_S$ inputted from the AC power supply 200 includes a phase in which the switching frequency $f_{SW}$ has an operable value, if the first frequency value $f_1$ is smaller than the upper limit value fc for the operable frequency value of the switching frequency $f_{SW}$, even when the switching frequency $f_{SW}$ of the first switch S31 of the power pulsation absorbing circuit 130 has a maximum value which is greater than the upper limit value fc for the operable frequency value of the switching frequency $f_{SW}$.

For this reason, the first frequency value $f_1$ may be preferably smaller than the upper limit value fc for the operable frequency value of the switching frequency $f_{SW}$. In addition, the first power value $P_{O1}$ may be preferably different from the second power value $P_{O2}$, wherein the charger 100 may be preferably operated according to combination of the continuous current mode mixed with the discontinuous current mode (mixed operation) within a range of the output power value Pout of the DC/DC converter 120 which is equal to or greater than the first power value $P_{O1}$ and smaller than the second power value $P_{O2}$.

For example, when the output power value Pout of the DC/DC converter 120 is equal to or greater than the first power value $P_{O1}$ and smaller than the second power value $P_{O2}$, the controller 140 may preferably control the switches S21 to S28 of the DC/DC converter 120 and the switch S31 of the power pulsation absorbing circuit 130 according to the continuous current mode during a first phase $T_{CCM}$ of one period of the AC voltage $v_S$ inputted from the AC power supply 200, wherein the controller 140 may control the switches S21 to S28 of the DC/DC converter 120 and the switch S31 of the power pulsation absorbing circuit 130 according to the discontinuous current mode during another phase of this one period of the AC voltage $v_S$ (second phase $T_{DCM}$) which is different from the first phase $T_{CCM}$.

This enables operation according to the continuous current mode to be applied during part of one period of the AC voltage $v_S$ even when the output power value is a value which does not allow operation according to the continuous current mode during one entire period of the AC voltage $v_S$. As a result, it is possible to improve the efficiency at a small to medium load.

Figure 10:
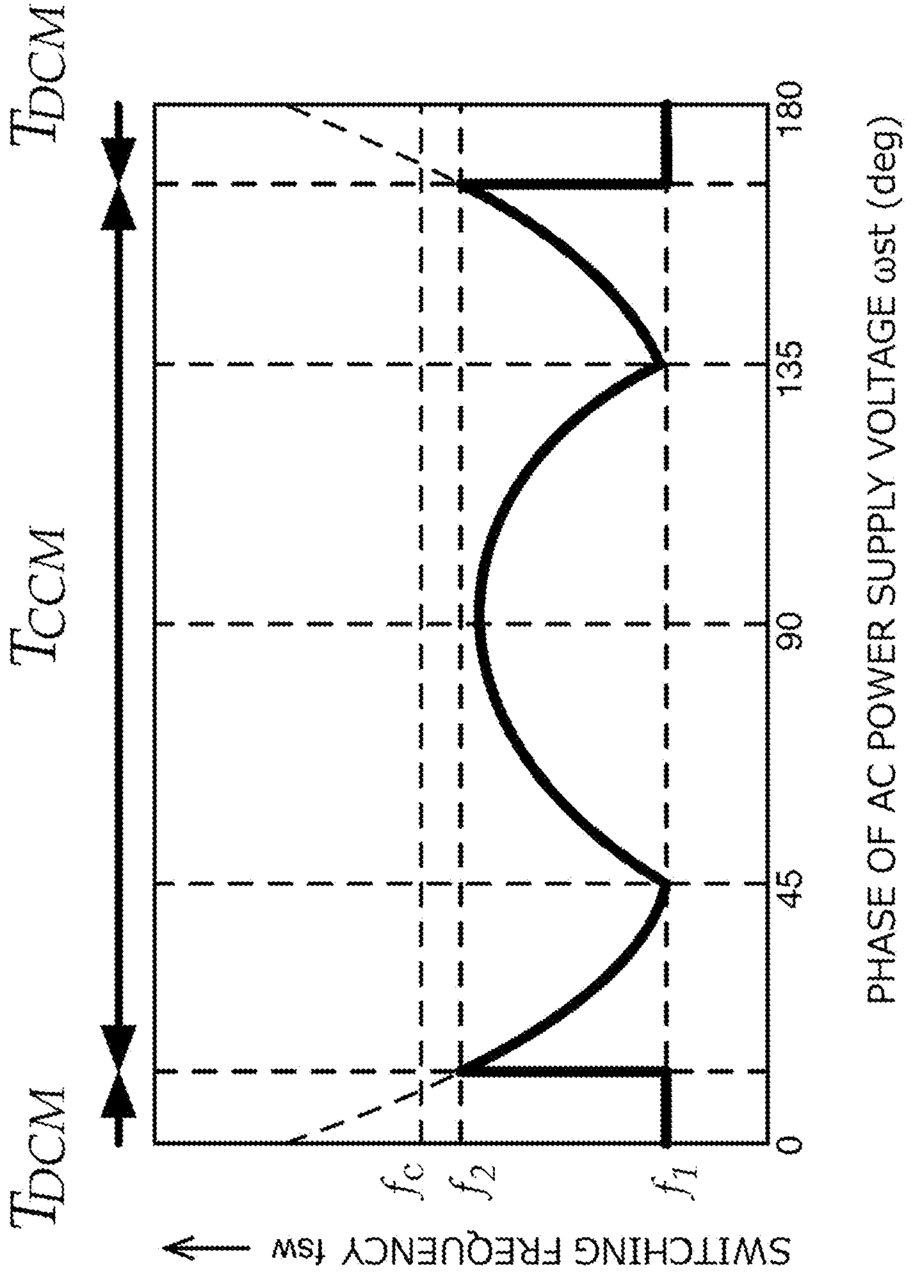
FIG. 10 shows an example of a change of the switching frequency $f_{SW}$ in the case of mixed operation with continuous and discontinuous current mode.

In this case, the controller 140 may preferably set the first phase $T_{CCM}$ such that a maximum value of the switching frequency $f_{SW}$ is equal to or smaller than a second frequency value $f_2$ which is greater than the first frequency value $f_1$, as shown in FIG. 10. The second frequency value $f_2$ is equal to or smaller than the upper limit value fc for the operable frequency value of the switching frequency $f_{SW}$, wherein the second frequency value $f_2$ is selected appropriately.

Figure 11:
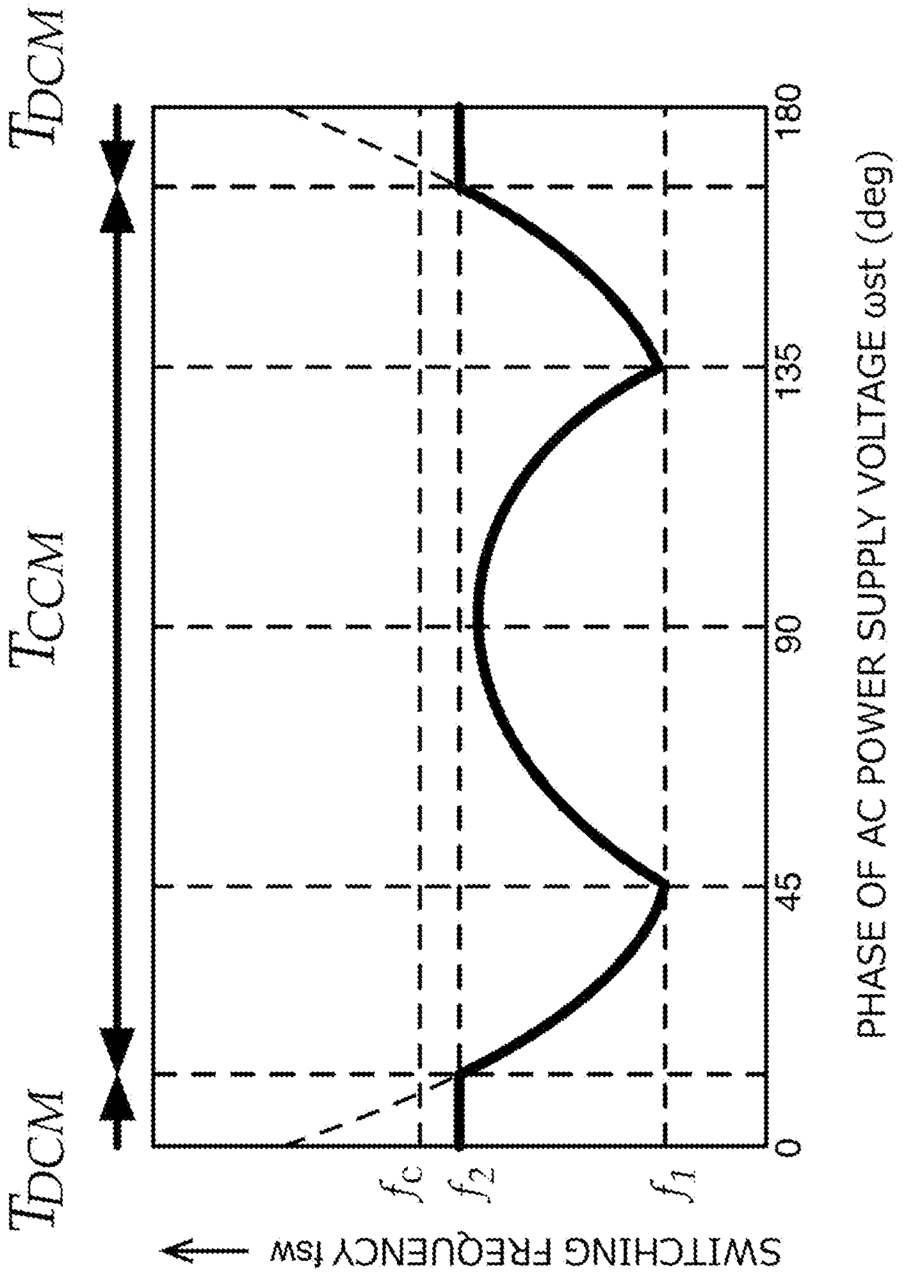
FIG. 11 shows an example of a change of the switching frequency $f_{SW}$ in the case of mixed operation with continuous and discontinuous current mode.

The switching frequency $f_{SW}$ for the second phase $T_{DCM}$ may have the first frequency value $f_1$ as shown in FIG. 10, or may have the second frequency value $f_2$ as shown in FIG. 11. In FIG. 11, the maximum value of the switching frequency $f_{SW}$ is the second frequency $f_2$. When the switching frequency $f_{SW}$ for the second phase $T_{DCM}$ is the second frequency value $f_2$, smoother operation can be achieved as compared to operation with the switching frequency $f_{SW}$ for the second phase $T_{DCM}$ which is equal to the first frequency value $f_1$. However, the discontinuous current mode includes hard switching operation. Such hard switching operation causes larger loss as the switching frequency $f_{SW}$ is higher. For this reason, better efficiency may be obtained with the switching frequency $f_{SW}$ for the second phase $T_{DCM}$ which is the first frequency value $f_1$, as compared to operation with the switching frequency $f_{SW}$ for the second phase $T_{DCM}$ which is equal to second frequency value $f_2$.

Moreover, the first phase $T_{CCM}$ may preferably have a time at which the AC power supply voltage $v_S$ has a phase $\omega_S t$ of 90 degrees, as shown in FIGS. 10 and 11. In the continuous current mode with optimization of the current set value $I_L'$, the switching frequency $f_{SW}$ has a changing rate of zero at a time of the phase $\omega_S t$ of 90 degrees of the AC power supply voltage $v_S$, wherein the switching frequency $f_{SW}$ has a local maximum value, as shown in FIG. 7. The switching frequency $f_{SW}$ has a local minimum value at times of the phase $\omega_S t$ of 45 degrees of the AC power supply voltage $v_S$ and the phase $\omega_S t$ of 135 degrees of the AC power supply voltage $v_S$. For this reason, the first phase $T_{CCM}$ is longer when the first phase $T_{CCM}$ includes a time of the phase $\omega_S t$ of 90 degrees of the AC power supply voltage $v_S$. This means that the operation phase according to the continuous current mode is longer and has an improved efficiency.

The switching frequency $f_{SW}$ at the time of the phase $\omega_S t$ of 90 degrees of the AC power supply voltage $v_S$ has a value which is larger as the output power value Pout of the DC/DC converter 120 is smaller, as shown in FIG. 7. This means that when the output power value Pout of the DC/DC converter 120 is smaller than a certain value, the switching frequency $f_{SW}$ at the time of the phase $\omega_S t$ of 90 degrees of the AC power supply voltage $v_S$ has a value which is greater than the second frequency value $f_2$. For this reason, the first power value $P_{O1}$ may be preferably selected e.g. such that the first phase $T_{CCM}$ includes a time at which the AC power supply voltage $v_S$ has a phase $\omega_S t$ of 90 degrees. This means that the first power value $P_{O1}$ may be preferably selected such that the switching frequency $f_{SW}$ at a time at which the switching frequency $f_{SW}$ has a changing rate of zero is equal to or smaller than the second frequency value $f_2$. In particular, the first power value $P_{O1}$ may be preferably selected such that the switching frequency $f_{SW}$ at the time at which the switching frequency $f_{SW}$ has a changing rate of zero in the mixed operation mode is equal to the second frequency value $f_2$. This enables a wider range of the output power value Pout to be obtained within which the switching is performed according to the mixed operation mode. As a result, it is possible to operate the charger 100 more efficiently.

Furthermore, when the DC/DC converter 120 has an output power value Pout for which the switching frequency $f_{SW}$ the case of switching according to the continuous current mode during all phases of one period of the AC voltage $v_S$ has a maximum value which is equal to or smaller than the second frequency value $f_2$, it is possible to operate the DC/DC converter 120 according to the continuous current mode during one entire period of the AC voltage. Therefore, the second power value $P_{O2}$ may be also selected based on the second frequency value $f_2$. For example, the second power value $P_{O2}$ may be thus preferably selected such that the switching frequency $f_{SW}$ in the case of changing the switching according to the continuous current mode during all phases of one period of the AC voltage $v_S$ has a maximum value which is equal to or smaller than the second frequency value $f_2$. In particular, the second power value $P_{O2}$ may be thus preferably selected such that the switching frequency $f_{SW}$ in the case of changing the switching according to the continuous current mode during all phases of one period of the AC voltage $v_S$ in a second operation mode has a maximum value which is equal to the second frequency value $f_2$. This enables a wider range of the output power value Pout to be obtained within which the switching is performed only according to the continuous current mode. As a result, it is possible to operate the charger 100 more efficiently.

Figure 12:
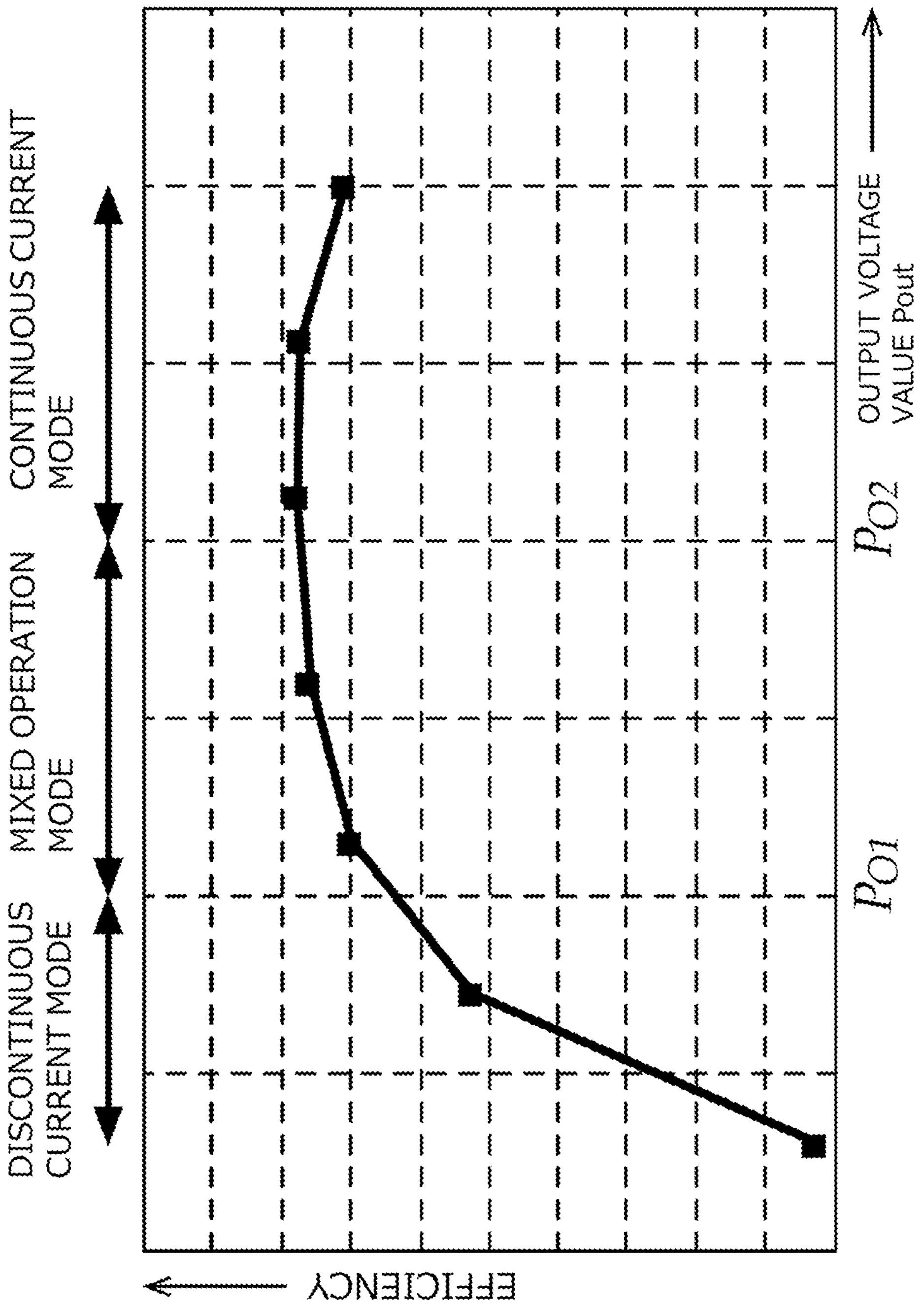
FIG. 12 shows an example of a relationship between the output power value Pout and the efficiency.

FIG. 12 shows an example of efficiency which may be obtained in the case of operating the charger 100 according to combined operation of the continuous current mode mixed with the discontinuous current mode (mixed operation) within a range of the output power value Pout of the DC/DC converter 120 which is equal to or greater than the first power value $P_{O1}$ and smaller than the second power value $P_{O2}$. As shown in FIG. 12, when the charger 100 is operated according to the mixed operation mode within the range of the output power value Pout of the DC/DC converter 120 which is equal to or greater than the first power value $P_{O1}$ and smaller than the second power value $P_{O2}$, the efficiency is improved within a range of the output power value Pout of the DC/DC converter 120 which is smaller, as compared to the example shown in FIG. 8, and a continuous change of the efficiency may be obtained.

Although the present invention has been described above with reference to voltage decrease operation by way of example, the charger 100 according to the present embodiment may perform voltage increase operation (S. Komeda, S. Takuma and Y. Ohnuma, "Boost Operation of a Dual-Active-Bridge AC-DC Converter with an Active Energy Buffer," 2022 IEEE Energy Conversion Congress and Exposition (ECCE), Detroit, MI, USA, 2022, pp. 1-6, doi: 10.1109/ECCE50734.2022.9948064). Also in the case of voltage increase operation, the switching frequency has a maximum value which is larger as the output power value of the DC/DC converter is smaller. Therefore, the present invention as described above may be applied to the voltage increase operation.

The present invention has been described above by means of the preferable embodiment thereof. Although the invention has been described herein by presenting a specific example, various modifications and changes may be made to such an example without departing from the spirit and scope of the invention as set forth in the claims.

REFERENCE SIGNS LIST

100 Charger
110 Rectifier
120 DC/DC converter
S21-S28 Switches of the DC/DC converter
130 Power pulsation absorbing circuit
D31 First diode
D32 Second diode
D33 Third diode
Lb Inductor
Cbuf Buffer capacitor
S31 First switch
S32 Second switch
200 AC power supply
300 Battery

What is claimed is:

1. A charger comprising:
a rectifier including two input terminals, a cathode terminal and an anode terminal, wherein the two input terminals are configured for connection to an AC power supply;
a DC/DC converter including a first terminal, a second terminal and two output terminals, the first terminal being configured to be connected to the cathode terminal of the rectifier via a first line, the second terminal being configured to be connected to the anode terminal of the rectifier via a second line, wherein the output terminals are configured for connection to a battery;
a power pulsation absorbing circuit including a first diode, a second diode, a third diode, an inductor, a capacitor, a first switch and a second switch; and
a controller configured to control switching of a switch of the DC/DC converter and switching of the first switch and the second switch,
wherein the first diode is connected between the inductor of the power pulsation absorbing circuit and one of the two input terminals of the rectifier, and the second diode is connected between the inductor and another of the two input terminals of the rectifier,
wherein the capacitor and the first switch are connected in series between the first line and the second line with the capacitor being arranged closer to the second line than the first switch,
wherein the third diode is connected between the inductor of the power pulsation absorbing circuit and a line which connects the capacitor to the first switch,
wherein the second switch is connected between the second line and a line which connects the inductor of the power pulsation absorbing circuit to the third diode,
wherein when an output power value of the DC/DC converter is smaller than a first power value, the controller is configured to control the switch of the DC/DC converter and the first switch according to a discontinuous current mode during one entire period of an AC voltage inputted from the AC power supply, and
wherein when the output power value of the DC/DC converter is equal to or greater than a second power value, the controller is configured to control the switch of the DC/DC converter and the first switch according to a continuous current mode during one entire period of the AC voltage.

2. The charger according to claim 1,
wherein in the discontinuous current mode, the controller is configured not to change a switching frequency of the switch of the DC/DC converter and the first switch, and
wherein in the continuous current mode, the controller is configured to change the switching frequency of the switch of the DC/DC converter and the first switch.

3. The charger according to claim 1,
wherein the first power value is different from the second power value,
wherein when the output power value of the DC/DC converter is equal to or greater than the first power value and smaller than the second power value, the controller is configured to:
control the switch of the DC/DC converter and the first switch according to the continuous current mode during a first phase of one period of the AC voltage; and
control switching of the switch of the DC/DC converter and the first switch according to the discontinuous current mode during a phase of the period of the AC voltage which is different from the first phase.

4. The charger according to claim 3,
wherein the controller is configured to:
control switching of the switch of the DC/DC converter and the first switch to obtain an operation waveform of the inductor of the DC/DC converter which is approximable by a rectangular waveform; and
in the continuous current mode, control a set value of a peak value of the rectangular waveform in such a manner that a minimum value of the switching frequency becomes a first frequency value.

5. The charger according to claim 4,
wherein the controller is configured to set the first phase such that a maximum value of the switching frequency is equal to or smaller than a second frequency value which is greater than the first frequency value.

6. The charger according to claim 5,
wherein the switching frequency for the phase of the period of the AC voltage inputted from the AC power supply which is different from the first phase has the first frequency value.

7. The charger according to claim 5, wherein the maximum value of the switching frequency is the second frequency value, and wherein the switching frequency for the phase of the period of the AC voltage inputted from the AC power supply which is different from the first phase has the second frequency value.

8. The charger according to claim 5, wherein the first power value is selected such that the switching frequency at a time at which the switching frequency has a changing rate of zero is equal to or smaller than the second frequency value.

9. The charger according to claim 8, wherein the second power value is selected such that the maximum value of the switching frequency when the switch of the DC/DC converter and the first switch are controlled according to the continuous current mode during one entire period of the AC voltage is equal to or smaller than the second frequency value.

10. The charger according to claim 1, wherein the DC/DC converter is configured as a DAB (Dual Active Bridge) converter.

* * * * *